June 3, 1941.    H. F. BAKEWELL    2,244,185
TOOL MOUNTING
Filed Feb. 7, 1940
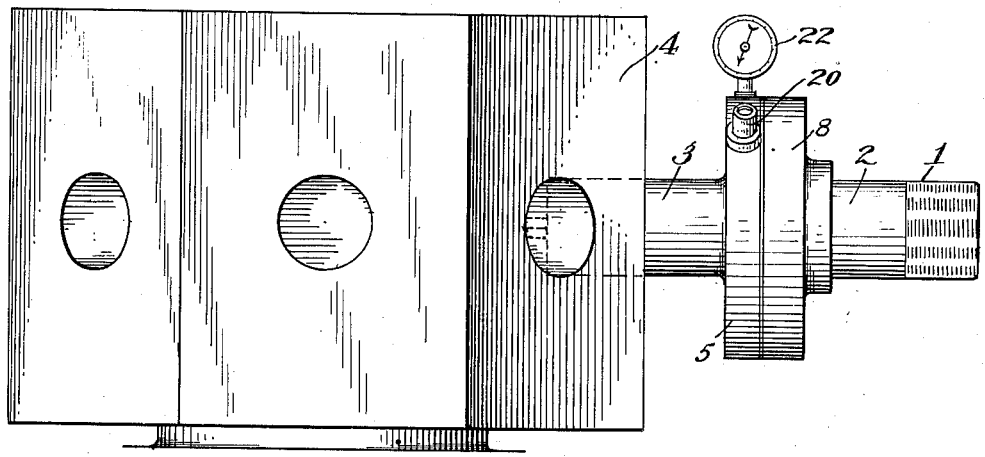
Fig.1.
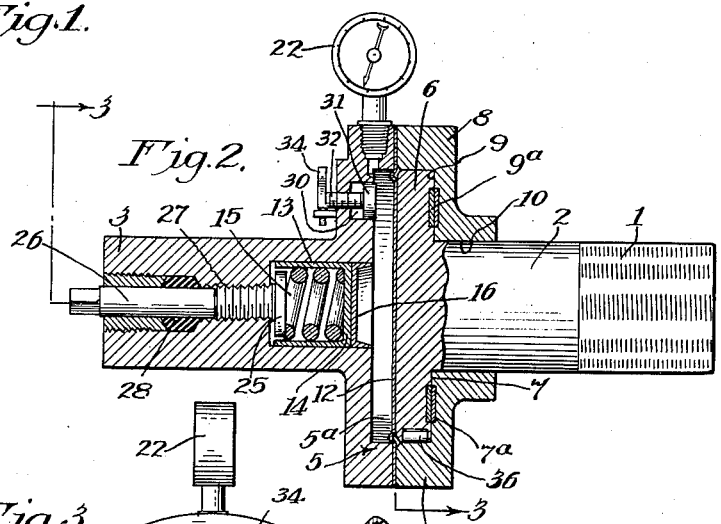
Fig.2.
Fig.3.
INVENTOR.
Harding F. Bakewell,
BY
ATTORNEY.

Patented June 3, 1941

2,244,185

UNITED STATES PATENT OFFICE 2,244,185

TOOL MOUNTING

Harding F. Bakewell, San Marino, Calif.

Application February 7, 1940, Serial No. 317,689

15 Claims. (Cl. 10—135)

This invention is a tool mounting, and has for an object to adapt a supporting shank for mounting in a suitable holder such as a chuck or turret head, with a tool shank fixed against rotation relative to the supporting shank throughout a predetermined range of torque capacity, but automatically released for rotation relative to the supporting shank responsive to excessive torque.

It is a further object of the invention to provide fluid pressure responsive means for fixing the tool shank against rotation relative to its supporting shank, and to regulate the fluid pressure so as to adapt the tool shank for release and relative rotation when predetermined torque capacity is exceeded.

It is a still further object of the invention to maintain predetermined fluid pressure against possible slight leakage.

It is a still further object of the invention to adjust the fluid pressure, for increase or decrease, without supplying additional pressure fluid or bleeding-off a portion of the fluid.

It is a still further object of the invention to release the tool shank at the will of the operator, for rotation in one direction relative to its supporting shank, while fixing the tool shank against rotation in the opposite direction but permitting its longitudinal displacement relative to the supporting shank.

Further objects of the invention will be readily understood from the following description of the accompanying drawing which illustrates a form which the invention may assume in practice, it being understood that the form which is shown and described is for purpose of illustration and that the invention may be modified and is entitled to various forms without departing from the scope of the appended claims.

In the drawing:

Fig. 1 is a side elevation of a rotary tool having a mounting in accordance with the invention and adapted for support in a turret head.

Fig. 2 is an axial section through the mounting.

Fig. 3 is a transverse section on the line 3—3 of Fig. 2.

The tool may be any type of rotary tool such as a drill or threading tool, and is shown as a tap 1 at the end of a tap shank 2. The mounting for the shank 2 includes a supporting shank 3 adapted for usual quick-detachable mounting in any suitable holder which is illustrated as a turret head 4, the tool in this instance being adapted for operation by rotating the work (not shown) relative to the normally non-rotatable tool, and the feed of the tool being by axial displacement of either the turret head 4 or the rotatable work.

The mounting for the shank 2 fixes it against rotation relative to the supporting shank 3 within predetermined range of torque capacity, but is adapted to yield for relative rotation of the shanks 2—3 when predetermined torque capacity is exceeded.

As an instance, the end of the shank 3 forms a chamber 5 adapted for reception of a disc 6 which is integral with the inner end of the shank 2 and which has a friction surface 7; and a cover 8 for the chamber 5 overlies the disc 6 so as to form a friction surface 9 cooperating with the surface 7. The cover 8 forms a radial bearing 10 for the shank 2, and is detachably secured to the periphery of the chamber 5 as shown at 11.

Longitudinal thrust engages the cooperating friction surfaces 7—9 for securing the shanks 2—3 against relative rotation, the surfaces 7—9 being preferably provided with inserts 7a—9a of friction material; and this longitudinal thrust and resulting frictional engagement is maintained by means adapted to yield and release the frictional engagement when predetermined torque capacity is exceeded. The means for yieldably maintaining predetermined longitudinal thrust is preferably fluid pressure.

As an instance, the periphery of a diaphragm 12 may be clamped between the periphery of the chamber 5 and the periphery of its cooperating cover 8, with the diaphragm detachably held in place by the retaining means 11. One surface of the diaphragm thus engages the disc 6; and a space 5a is formed in the chamber 5 at the opposite surface of the diaphragm, with the space 5a adapted for reception of pressure fluid. Pressure of the fluid is thus exerted against the diaphragm 12 for pressing it against the disc 6 so as to maintain frictional engagement at the cooperating friction surfaces 7—9.

The fluid pressure is preferably that of a substantially non-compressible fluid such as oil, the space 5a having a spring-contractible extension and the pressure fluid being supplied to the space 5a so as to expand this extension and tension its spring, whereby the latter maintains desired pressure of the fluid against the diaphragm 12. As an instance, the shank 3 is bored to form a cylinder 13 which communicates with and forms an extension of the space 5a, and a piston 14 is adapted for reciprocation in the cylinder 13 and is yieldably urged toward the space 5a by a spring 15.

The piston preferably includes a head 16 of packing material, and is preferably a sleeve piston forming a guide for the spring 15.

Fluid, under pressure, may be supplied to the space 5a via a nipple 20 which projects from the periphery of the chamber 5, and which has a usual check valve 21 and is adapted for quick-detachable engagement by a cooperating coupling of a supply conduit (not shown). The pressure fluid which is supplied to the space 5a via the nipple 20, retracts the piston 14 in its cylinder 13 and thereby tensions the spring 15 so that when the supply conduit is disconnected from the nipple (with the check valve 21 preventing escape of fluid from the space 5a) the tensioned spring 15 maintains predetermined fluid pressure against the diaphragm 12 as indicated by a pressure gauge 22 which projects from the periphery of the chamber 5. In the event of slight leakage, the tensioned spring 15 projects the piston 14 for contracting the space which contains the pressure fluid, thus compensating for leakage loss so as to maintain the predetermined fluid pressure against the diaphragm 12.

Means are preferably provided for adjusting the fluid pressure exerted against the diaphragm 12 (for increasing or decreasing the same) without supplying additional fluid to or bleeding fluid from the space 5a. For this purpose, the end of the spring 15 which is remote from the piston 14 may seat against an abutment 25 which is adapted for longitudinal adjustment in the cylinder 13. The abutment is adapted for manual adjustment; and as an instance a stem 26 extends from the abutment through a bore in the shank 3, for manual engagement of the outer end of the stem for rotating the same, and with the stem threaded in its cooperating bore as shown at 27 and preferably packed-off as shown at 28. By rotating the stem 26, its threaded engagement 27 thus longitudinally displaces the abutment 25 for increasing or decreasing the tension of the spring 15 so as to correspondingly vary the fluid pressure exerted against the diaphragm 12.

In operation, with predetermined fluid pressure in the space 5a, the cooperating friction surfaces 7—9 are engaged so as to fix the shanks 2—3 against relative rotation, and the tool is thus adapted for normal operation by relative rotation of the tool shank and the work; but in the event predetermined torque capacity is exceeded, the fluid pressure in the space 5a permits longitudinal yielding of the disc 6 for slippage at the cooperating friction surfaces 7—9, thereby releasing the tool shank 2 for rotation relative to its supporting shank 3 and thus rendering the tool inoperative. By regulating the fluid initially supplied via the nipple 20, or by subsequently adjusting the stem 26, the fluid pressure exerted against the diaphragm 12 may be regulated for longitudinal yielding of the disc 6 and automatic release of the driving connection 7—9 at any predetermined torque capacity.

The improved mounting thus provides safety means, adapted for quick-detachable mounting of the shank 3 in any usual holder, with the tool shank 2 fixed against rotation relative to the shank 3 and thus adapted for normal operation of the tool throughout any predetermined range of torque capacity, but adapted for release of the shank 2 for rotation relative to the shank 3, in the event the predetermined torque capacity is exceeded.

Means are preferably provided, whereby at the will of the operator the fluid pressure against the diaphragm 12 may be relieved so as to permit longitudinal yielding of the disc 6 for releasing the driving connection 7—9. For this purpose, a chamber 30 communicates with and forms an extension of the space in which the pressure-fluid is confined, with a piston 31 adapted for longitudinal adjustment in the chamber 30 for expanding or contracting the pressure-fluid space.

The piston 31 may be adjusted by a threaded stem 32 which has an operating lever 34 at the exterior of the chamber 5 and convenient to the operator. Adjustable stops 35 may be provided for limiting manual adjustment of the lever 34, so that when the lever is swung to one limit of movement the piston 31 is projected for so contracting the space in which the pressure-fluid is confined as to maintain predetermined pressure against the diaphragm 12 for engaging the driving connection 7—9, and when the lever 34 is swung to its opposite limit of movement the piston 31 is retracted in its chamber 30 for so expanding the pressure-fluid space as to permit yielding of the diaphragm 12 and disengagement of the driving connection 7—9.

The lever 34 is normally swung to its position projecting its piston 31 and thus contracting the pressure-fluid space. The tool shank 2 and its supporting shank 3 are thus fixed against relative rotation, for tapping operation as previously described. When the work has been tapped to the desired depth, the lever 34 is manually swung to its position retracting its piston 31 and thus relieving the fluid pressure and disengaging the driving connection 7—9 so that the tool shank 2 is free for rotation relative to the shank 3, thereby discontinuing the tapping operation whether or not rotation of the work relative to the supporting shank 3 has been stopped.

Means are preferably provided for then floating the tool shank 2 from the tapped work. For this purpose, a one-way clutch is provided between the disc 6 and the chamber 5, with the clutch being adapted to automatically engage for fixing the tool shank 2 against rotation relative to its supporting shank 3 when the torque is in one direction, and being adapted to automatically disengage for free relative rotation of the shanks 2—3 in the opposite direction.

As an instance, the clutch may comprise a roller 36 journaled in a groove in the periphery of the disc 6, with the base of the groove inclined as shown at 37. The roller thus binds in the shallow portion of the groove, for clutching engagement between the disc 6 and the chamber 5 when the work is relatively rotated in the direction for threaded retraction of the tool shank from the tapped work, and is retracted into the deep portion of the groove for releasing the clutching engagement when relative rotation is in the opposite direction.

The clutch 36 is thus inoperative during the tapping operation; and as previously described the tool shank 2 is released for free rotation relative to the shank 3 in the event of excessive torque or in the event of manual retraction of the piston 31 into its chamber 30. When the work and the supporting shank 3 are then relatively rotated in the opposite direction for threaded retraction of the tool shank from the tapped work, the clutch 36 engages so as to fix the shank 2 against rotation; and the tool shank is thus retracted from the tapped work by the lead of the thread which has been formed in the work. During this retraction of the tool shank, the piston 31 is manually retracted in its chamber 30 so as to relieve the fluid pressure against the diaphragm 12. The disc 6 is thus free for longitudinal displacement in the chamber 5 so that the tool shank 2 floats relative to the shank 3 during its threaded withdrawal from the work, instead of the cover of the chamber 5 longitudinally abutting the disc 6 for positively retracting the tool shank.

I claim:

1. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, and means for maintaining fluid pressure in the chamber for engaging the friction surfaces for fixing the shanks against relative rotation, the fluid pressure permitting yielding of the engagement of the friction surfaces responsive to torque in excess of predetermined torque capacity, for relative rotation of the shanks.

2. In a tool mounting, a supporting shank, a tool shank, one of said shanks having a chamber provided with a friction surface, a diaphragm in the chamber, the other shank having an end provided with a friction surface, said shank-end being adapted for journaled reception in the chamber between the friction surface of the chamber and the diaphragm, for engagement of the friction surfaces, and means for maintaining fluid pressure in the chamber at the opposite side of the diaphragm, for pressing the diaphragm against the shank-end for engaging the friction surfaces for fixing the shanks against relative rotation, the fluid pressure permitting yielding of the diaphragm responsive to torque in excess of predetermined torque capacity, for yielding of the engagement of the friction surfaces for relative rotation of the shanks.

3. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, a nipple projecting from the chamber and adapted for detachable engagement by a conduit for supplying pressure fluid to the chamber, the nipple having a check valve adapted to close against escape of pressure fluid from the chamber, the fluid pressure in the chamber being adapted to engage the friction surfaces for fixing the shanks against relative rotation, and said fluid pressure permitting yielding of the engagement of the friction surfaces responsive to torque in excess of predetermined torque capacity, for relative rotation of the shanks.

4. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, and means for supplying pressure fluid to the chamber, the chamber having a spring-contractible extension adapted for expansion responsive to the pressure fluid for tensioning its spring, the tensioned spring maintaining fluid pressure in the chamber for engaging the friction surfaces for fixing the shanks against relative rotation, and the fluid pressure permitting yielding of the engagement of the friction surfaces responsive to torque in excess of predetermined torque capacity, for relative rotation of the shanks.

5. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, means for supplying pressure fluid to the chamber, the chamber having a spring-contractible extension adapted for expansion responsive to the pressure fluid for tensioning its spring, and means for adjusting the tension of the spring, the tensioned spring maintaining fluid pressure in the chamber for engaging the friction surfaces for fixing the shanks against relative rotation, and the fluid pressure permitting yielding of the engagement of the friction surfaces responsive to torque in excess of predetermined torque capacity, for relative rotation of the shanks.

6. In a tool mounting, a supporting shank adapted for mounting in a tool holder, at tool shank journaled relative to the supporting shank, cooperating friction surfaces on the tool shank and the supporting shank, and fluid pressure means for maintaining engagement of the friction surfaces for fixing the shanks against relative rotation, the fluid pressure means permitting yielding of the engagement of the friction surfaces responsive to torque in excess of predetermined torque capacity, for relative rotation of the shanks.

7. In a tool mounting, a supporting shank adapted for mounting in a tool holder, a tool shank journaled relative to the supporting shank, cooperating friction surfaces on the tool shank and the supporting shank, fluid pressure means for maintaining engagement of the friction surfaces for fixing the shanks against relative rotation, the fluid pressure means permitting yielding of the engagement of the friction surfaces responsive to torque in excess of predetermined torque capacity, for relative rotation of the shanks, and means for adjusting the fluid pressure.

8. In a tool mounting, a supporting shank adapted for mounting in a tool holder, a tool shank journaled relative to the supporting shank, cooperating friction surfaces on the tool shank and the supporting shank, and means adapted for spring tensioning responsive to pressure fluid for maintaining fluid pressure engagement of the friction surfaces for fixing the shanks against relative rotation, the fluid pressure engagement permitting yielding of the engagement of the friction surfaces responsive to torque in excess of predetermined torque capacity, for relative rotation of the shanks.

9. In a tool mounting, a supporting shank adapted for mounting in a tool holder, a tool shank journaled relative to the supporting shank, cooperating friction surfaces on the tool shank and the supporting shank, means adapted for spring tensioning responsive to pressure fluid for maintaining fluid pressure engagement of the friction surfaces for fixing the shanks against relative rotation, the fluid pressure engagement permitting yielding of the engagement of the friction surfaces responsive to torque in excess of predetermined torque capacity, for relative rotation of the shanks, and means for adjusting the tension of the spring.

10. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, the chamber being adapted to contain pressure fluid for engaging the friction surfaces for fixing the shanks against relative rotation, and means operable at the will of the operator for enlarging capacity of the chamber for reducing pressure of the fluid so as to release the engagement of the friction surfaces for relative rotation of the shanks.

11. In a tool mounting, a supporting shank, a tool shank, one of said shanks having a chamber provided with a friction surface, the other shank having an end provided with a friction surface, said shank-end being adapted for journaled reception in the chamber for engagement of the friction surfaces, the chamber being adapted to contain pressure fluid, a spring-tensioned piston cooperating with the chamber for maintaining the fluid in the chamber under pressure for engaging the friction surfaces for fixing the shanks against relative rotation, the fluid pressure permitting yielding of the engagement of the friction surfaces responsive to torque in excess of predetermined torque capacity, for relative rotation of the shanks, and means operable at the will of the operator for enlarging capacity of the chamber for reducing pressure of the fluid so as to release the engagement of the friction surfaces for relative rotation of the shanks.

12. In a tool mounting, a supporting shank, a tool shank, one of said shanks having a chamber, the other shank having an end adapted for journaled reception in the chamber, cooperating elements in the chamber and at the shank-end, and means for maintaining fluid pressure in the chamber for engaging said cooperating elements for fixing the shanks against relative rotation, the fluid pressure permitting yielding of the engagement of said cooperating elements responsive to torque in excess of predetermined torque capacity, for relative rotation of the shanks.

13. In a tool mounting, a supporting shank, a tool shank, one of said shanks having a chamber, the other shank having an end adapted for journaled reception in the chamber, cooperating elements in the chamber and at the shank-end, and a nipple communicating with the chamber and adapted for detachable engagement by a conduit for supplying pressure fluid to the chamber, the nipple having a check valve adapted to close against escape of pressure fluid from the chamber, the fluid pressure in the chamber being adapted to engage said cooperating elements for fixing the shanks against relative rotation, and the fluid pressure permitting yielding of the engagement of said cooperating elements responsive to torque in excess of predetermined torque capacity, for relative rotation of the shanks.

14. In a tool mounting, a supporting shank, a tool shank, one of said shanks having a chamber, the other shank having an end adapted for journaled reception in the chamber, cooperating elements in the chamber and at the shank-end, the chamber being adapted to contain pressure fluid, a spring-tensioned piston cooperating with the chamber for maintaining the fluid in the chamber under pressure for engaging said cooperating elements for fixing the shanks against relative rotation, and the fluid pressure permitting yielding of the engagement of said cooperating elements responsive to torque in excess of predetermined torque capacity, for relative rotation of the shanks.

15. In a tool mounting, a supporting shank, a tool shank, one of said shanks having a chamber, the other shank having an end adapted for journaled reception in the chamber, cooperating elements in the chamber and at the shank-end, the chamber being adapted to contain pressure fluid for engaging said cooperating elements for fixing the shanks against relative rotation, the fluid pressure permitting yielding of the engagement of said cooperating elements responsive to torque in excess of predetermined torque capacity, for relative rotation of the shanks, and means operable at the will of the operator for enlarging capacity of the chamber for reducing pressure of the fluid so as to release the engagement of said cooperating elements for relative rotation of the shanks.

HARDING F. BAKEWELL.